(12) United States Patent
Brown et al.

(10) Patent No.: US 11,658,845 B2
(45) Date of Patent: May 23, 2023

(54) NEGOTIATED BRIDGE ASSURANCE IN A STACKED CHASSIS

(71) Applicant: Dell Products L.P., Round Rock, TX (US)

(72) Inventors: Michael E. Brown, Austin, TX (US); Dipinder Singh Chhabra, Austin, TX (US); Jitendra Gul Jagasia, Round Rock, TX (US); Charles B. Claggett, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 17/384,843

(22) Filed: Jul. 26, 2021

(65) Prior Publication Data

US 2023/0026147 A1 Jan. 26, 2023

(51) Int. Cl.
| | | |
|---|---|---|
| *H04L 12/40* | (2006.01) | |
| *H04L 12/46* | (2006.01) | |
| *H04L 12/24* | (2006.01) | |
| *G06F 13/40* | (2006.01) | |

(52) U.S. Cl.
CPC .... *H04L 12/40091* (2013.01); *G06F 13/4022* (2013.01); *G06F 13/4063* (2013.01); *H04L 12/40123* (2013.01); *H04L 12/462* (2013.01)

(58) Field of Classification Search
CPC ......... H04L 12/40091; H04L 12/40123; H04L 12/462; G06F 13/4022; G06F 13/4063
See application file for complete search history.

(56) References Cited

U.S. PATENT DOCUMENTS

| | | | | |
|---|---|---|---|---|
| 7,272,681 | B2* | 9/2007 | Davies | G06F 11/181 709/248 |
| 8,325,629 | B2* | 12/2012 | Tallet | H04L 45/48 370/256 |
| 10,361,948 | B2* | 7/2019 | Ballard | H04L 49/253 |
| 10,397,095 | B2* | 8/2019 | Krattiger | H04L 41/0803 |
| 11,012,301 | B2* | 5/2021 | Akkineni | H04L 45/02 |
| 2006/0114915 | A1 | 6/2006 | Kalkunte et al. | |
| 2006/0285499 | A1 | 12/2006 | Tzeng | |
| 2017/0063661 | A1 | 3/2017 | Claggett et al. | |

* cited by examiner

*Primary Examiner* — Rasheed Gidado
(74) *Attorney, Agent, or Firm* — Larson Newman, LLP

(57) ABSTRACT

An information handling system includes multiple data ports, a memory, and a processor. Each of the data ports enables a separate communication link of a plurality of communication links for the information handling system. The memory stores data to indicate whether the information handling system supports bridge assurance on each of the communication links. In response to the bridge assurance being supported in the information handling system, the processor provides a message across a first link of the communication links. The message indicates that bridge assurance is supported in the information handling system. The processor also determines whether an acknowledgement message has been received. In response to the acknowledgement message being received, the processor enables the bridge assurance on the first link.

21 Claims, 4 Drawing Sheets

NEGOTIATED BRIDGE ASSURANCE IN A STACKED CHASSIS

FIELD OF THE DISCLOSURE

The present disclosure generally relates to negotiated bridge assurance in a stacked chassis information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes multiple data ports, a memory, and a processor. Each of the data ports may enable a separate communication link of a plurality of communication links for the information handling system. The memory may store data to indicate whether the information handling system supports bridge assurance on each of the communication links. In response to the bridge assurance being supported in the information handling system, the processor may provide a message across a first link of the communication links. The message may indicate that bridge assurance is supported in the information handling system. The processor also may determine whether an acknowledgement message has been received. In response to the acknowledgement message being received, the processor may enable the bridge assurance on the first link.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
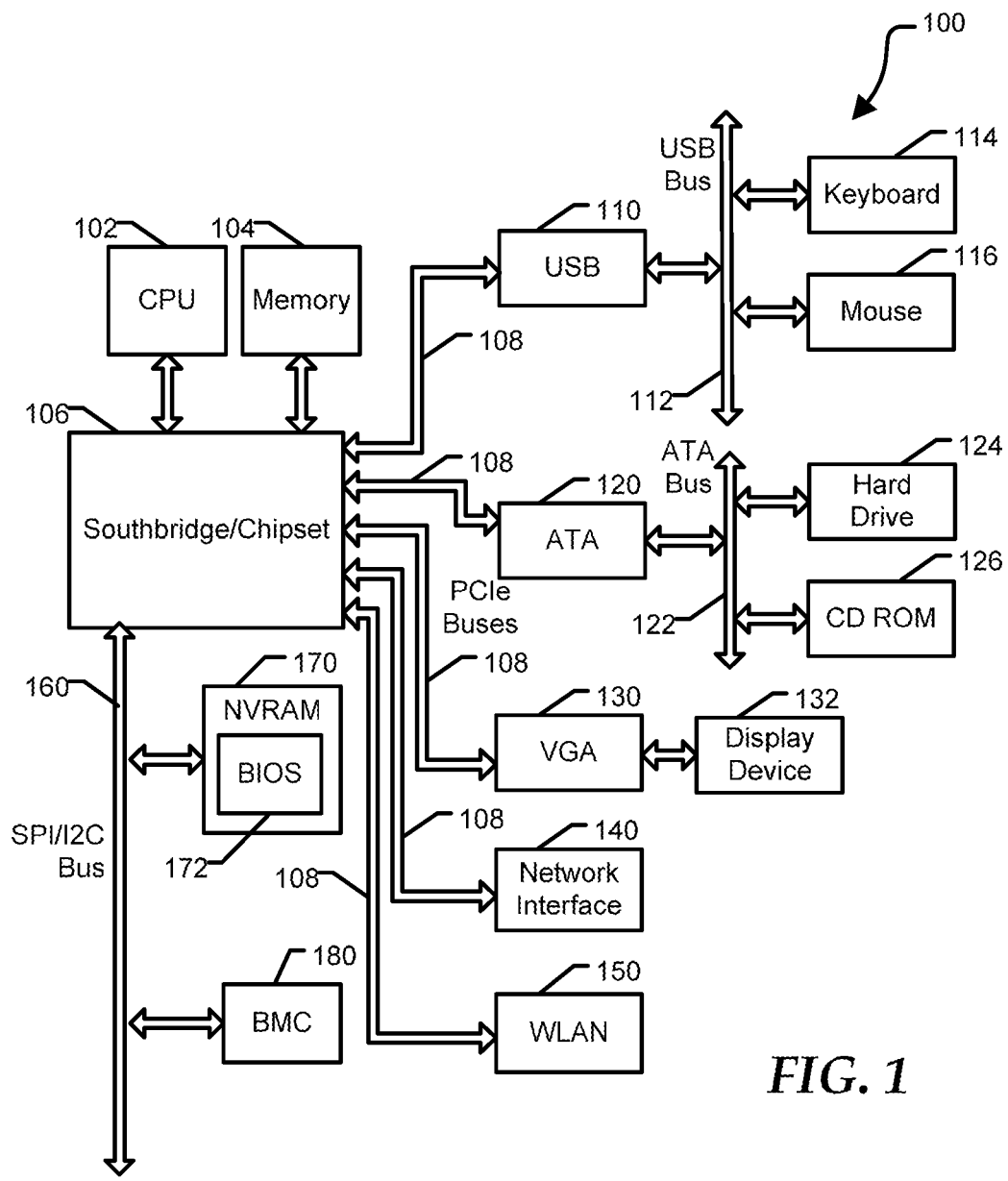
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
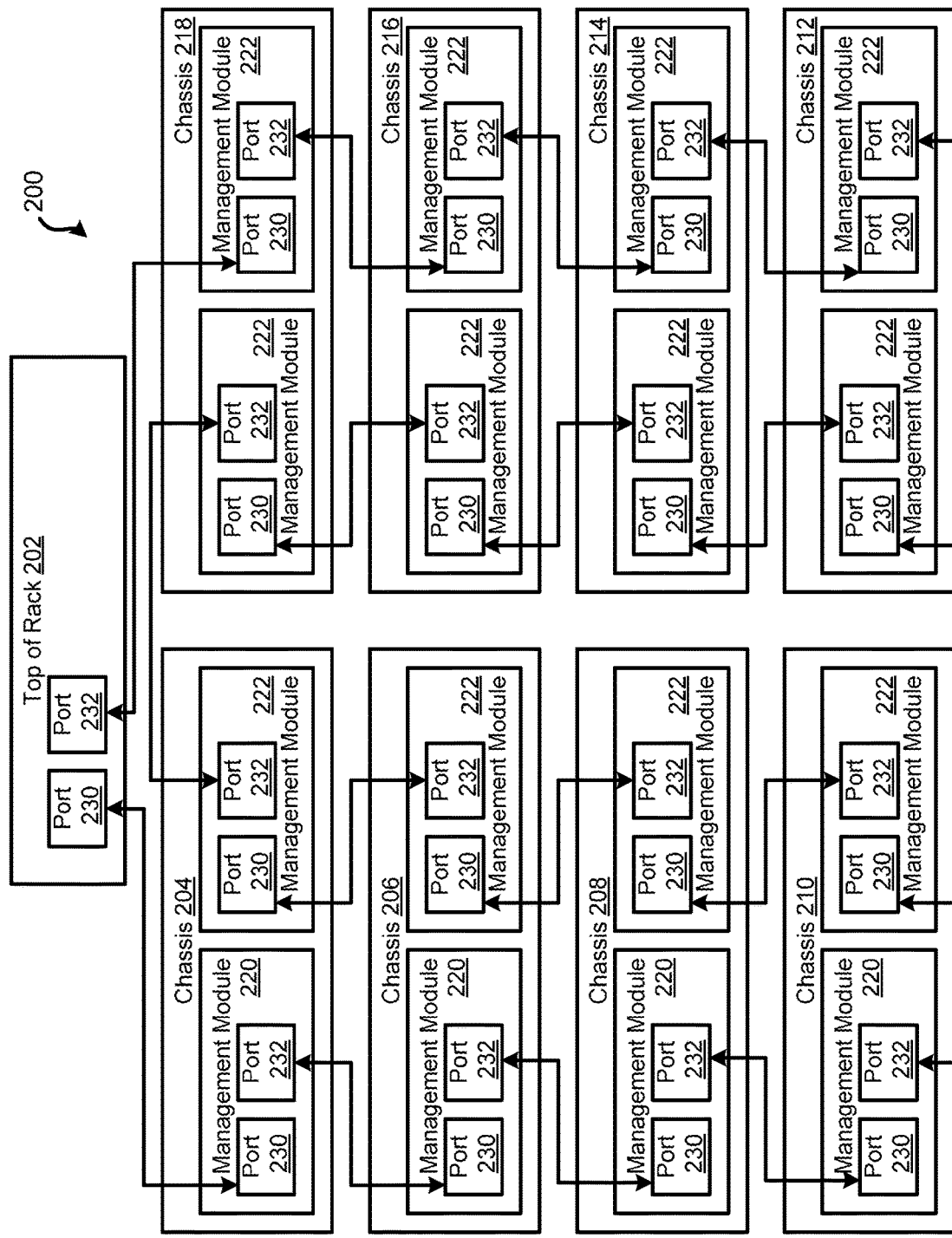
FIG. 2 is a diagram of a portion of a server rack system according to at least one embodiment of the present disclosure.

In an example, information handling system 100 may be any suitable device including, but not limited to, top of tack 202, one of chassis 204, 206, 208, 210, 212, 214, 216, and 218, and management modules 220 and 222 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of a server rack system 200 according to at least one embodiment of the present disclosure. System 200 includes a top of rack switch 202, and multiple servers or chassis 204, 206, 208, 210, 212, 214, 216, and 218 (204-218). Each of servers 204-218 includes management modules 220 and 222. Top of rack switch 202 and each server 204-218 includes communication ports 230 and 232. Servers 204-218 may be any suitable network devices, such as switches, routers, mainframes, hubs, or the like.

In certain examples, servers 204-218 may include additional components of those shown in FIG. 2 without varying from the scope of this disclosure. In an example, server rack system 200 may include any additional number of components without varying from the scope of this disclosure. Management modules 220 and 222 may include additional components over those shown in FIG. 2 including a processor, such as processor 102 of FIG. 1, without varying from the scope of this disclosure. In an example, a processor of a management module may communicate with ports 230 and 232 via any suitable interface including, but not limited to, a Media Independent Interface (MII) and a Serial Management Interface (SMI). For example, packets and other data may be communicated between processor and a port using MII, and configuration and status communications may be communicated using SMI.

In an example, servers 204-218 may be connected to top of rack switch 202 in any suitable manner. For example, server 204-218 may be connected in a daisy chain configuration with server 204 connected to communication port 230 of the top of rack switch and server 218 connected to communication port 232 of the top of the rack. In this configuration, server 204 may be the first device in the daisy chain configuration and server 218 may be the last device in the daisy chain. In each of servers 204-218, management module 220 may be an active management module and management module 222 may be a redundant or backup management module. For example, management module 220 may be the active management module and management module 222 may be configured as the redundant or back up management module.

As shown in FIG. 2, one of ports 230 and 232 may be configured as a receive port and the other port may be configured as a transmit port. For example, port 230 of top of rack 202 may transmit data to port 230 in management module 220 of server 204. In response to receiving the data, management module 232 may forward the data to port 230 in management module 220 of server 206. In certain examples, servers 206-218 may continue to forward the data to the next subsequent server until the data is received at port 232 of top of rack switch 202.

In an example, servers 204-218 may communicate via any suitable Ethernet network protocol, such as layer-2. In this example, if one of management modules 220 and 222 in a single server is not disabled, both of the management modules may provide the same data packet or message to the next server in the Ethernet network. If both management modules 220 and 222 of every server 204-218 forward broadcast or multicast data, a broadcast network loop may occur by the broadcast message being repeatedly rebroadcast and flooding the network.

To reduce the risk of a network loop from being created, servers 204-218 may implement spanning tree protocol (STP). STP may prevent network loop in many cases by defining which management modules 220 or 222 in a server is actively in the spanning tree communication path and defining the other management module as the backup or redundant management module. Thus, STP provides single active path between two adjacent servers in server rack system 200. STP may be defined by IEEE 802.1AB and IEEE 802.1D standards.

To perform spanning tree management, STP may be enabled on management module 220. Management module 220 may then both send and receive multicast packets, such as bridge protocol data units (BPDUs). During operation, management module 220 may receive STP information. Based on the received information, management module 220 may control ports 230 and 232 through the SMI of an interface to provide management functionality. For example, STP information provided to management module 220 may indicate a network loop, and the management module may eliminate the detected network loop.

During operation of components in server rack system 200, top of rack switch 202 may detect short network loops and isolate server rack system from a local area network. In this situation, top of rack switch 202 may enforce the isolation until the top of rack link to server 204 was manually reset. STP may only work as expected to prevent network loops if both link partners are actively running STP. Based on STP, peer links may automatically move to forwarding state if STP process does not happen or stops. For example, if the STP process or a whole kernel encounters any failure/panic situation, a switch associated with ports of a server may change to a free running operation and maintain the last link states. Any link placed in forwarding may remain in forwarding while the whole system is rebooting.

While utilizing STP, link partners, such as servers 204 and 206, may transmit and receive STP bridge protocol data units (BPDUs). However, if a link partner stops receiving STP BPDUs from the peer, the link partner may shortly start transition to forwarding state, which in turn may cause a network loop. When link partners implement a bridge assurance feature of a spanning tree implementation. When a link partner utilizing the bridge assurance feature stops receiving STP BPDUs, the bridge assurance feature transitions the link partner into a discarding state and then to a blocking state. The link partner in the blocking state may stop the transmission of data, such that a network loop is prevented. However, the bridge assurance feature is not forwards and backwards compatible, such that connectivity issues arise if the bridge assurance features is not simultaneously turned on both ends of a link. An information handling system may be improved by providing a negotiated bridge assurance feature. As described herein, the negotiated bridge assurance feature may automatically determine that both servers, such as servers 204 and 206, support bridge assurance before the feature is enable on the servers.

During a start up or boot of server rack system 200, environment stacking of servers 204-218 may be performed in any suitable manner. For example, each of servers 204-218 may pass a link layer discovery protocol (LLDP) messages between adjacent servers or link partners. For example, top of rack switch 202 may provide an LLDP message from port 230 to port 230 of server 204. In an example, the LLDP message may include an organization specific type length value (TLV). In certain examples, a company may utilize bits within the organization specific TLV portion of an LLDP message to define any specific data or information for servers 204-218. For example, the organization specific TLV portion of LLDP message may enable configuration options for servers 204-218 to be passed from one server to the next.

In an example, a particular bit of the organization specific TLV may be utilized as a feature flag. In this example, management module 220 or 222 may set the particular bit or feature flag to one value when the management module supports bridge assurance, and may set the feature flag bit to a different value when the management module does not support bridge assurance. Top of rack switch 202 and servers 204-218 may utilize the feature flag to implement a negotiated bridge assurance between link partners. In an example, linked partners of server rack system 200 may be any adjacent information handling systems in the stacked chassis environment. For example, top of rack switch 202 may be a linked partner with server 204, and may also be a linked partner with server 218. Similarly, server 204 may be a linked partner with server 206, which in turn may also be a linked partner with server 208. Linked partners may continue along the daisy chain as follows: server 210 may be linked partners with both server 208 and server 212; server 214 may be linked partners with both server 212 and server 216; and server 218 may be linked partners with both server 216 and stop of rack switch 202. The process or performing negotiated bridge assurance will be described with respect to FIG. 3.

Figure 3:
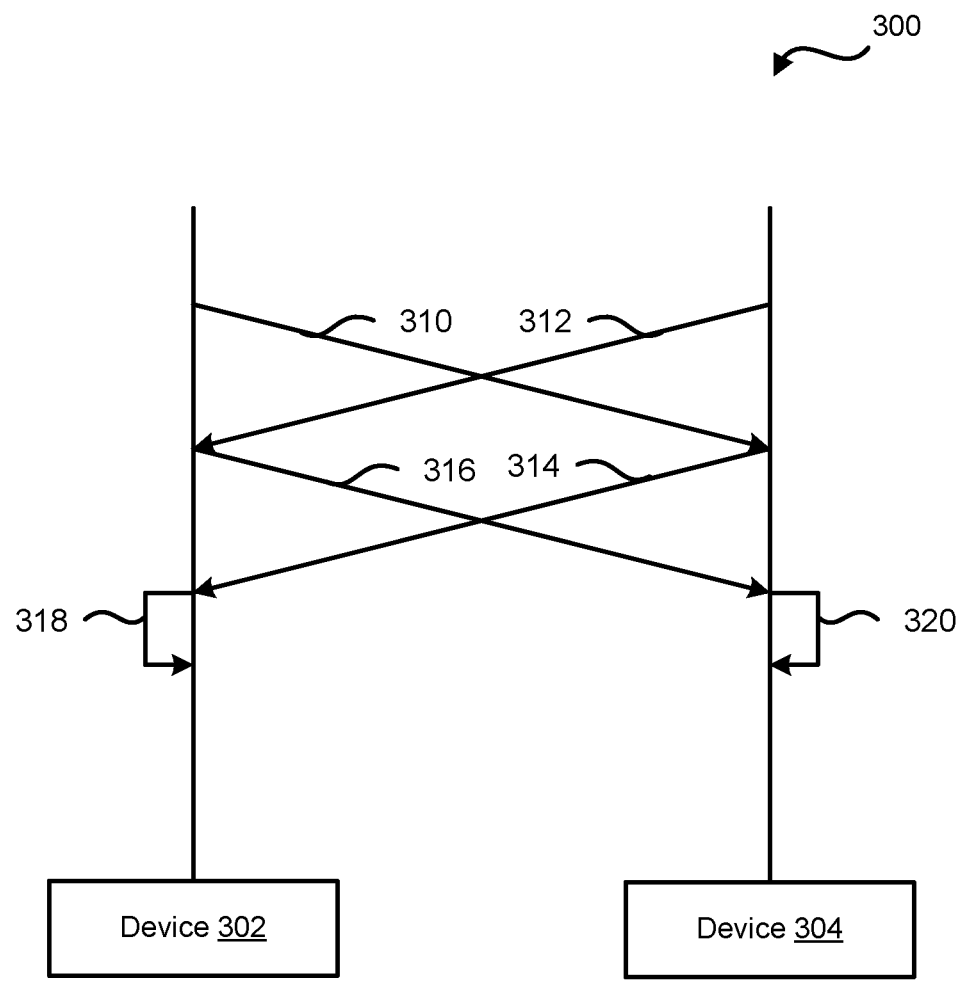
FIG. 3 is a flow diagram of a method for performing negotiated bridge assurance between linked devices according to at least one embodiment of the present disclosure.

FIG. 3 illustrates a flow diagram of a method 300 for performing negotiated bridge assurance between linked partner devices 302 and 304 according to at least one embodiment of the present disclosure. In an example, devices 302 and 304 may be any suitable devices including, but not limited to, top of rack switch 202 and servers 204-218 of FIG. 2. At operation 310, an LLDP message indicating that device 302 supports a bridge assurance feature is provided from device 302 to device 304. In an example, the LLDP message may indicate that device 302 supports the bridge assurance feature in any suitable manner including, but not limited to, setting a feature bit in the organization specific TLV portion of the LLDP. Similarly, an LLDP message indicating that device 304 supports bridge assurance is provided from device 304 to device 302 at operation 312.

In response to device 304 receiving the LLDP message from device 302, device 304 may determine whether the bridge assurance features is support in the device. In response to the bridge assurance feature being supported in device 304, the device may provide an acknowledgement (ACK) message to device 302 at operation 314. In an example, the ACK message may indicate that device 304 supports the bridge assurance feature and is ready to enable the bridge assurance feature. In response to the bridge assurance feature being supported in device 302, the device may provide an ACK message to device 304 at operation 318. In an example, the ACK message may indicate that device 302 supports the bridge assurance feature and is ready to enable the bridge assurance feature.

In response to receiving the ACK message from device 304, device 302 may enable the bridge assurance feature at operation 318. Similarly, in response to receiving the ACK message from device 302, device 304 may enable the bridge assurance feature at operation 320. In an example, in response to the bridge assurance feature being supported in both devices 302 and 304 and the bridge assurance feature being enabled, the linked partners may perform the bridge assurance feature of the STP to prevent possible network loops from occurring in a layer 2 network, such as the network formed via top of rack switch 202 and servers 204-218 of FIG. 2.

Referring back to FIG. 2, in an example, the negotiated bridge assurance performed between devices 302 and 304 in FIG. 3 may be performed between each set of linked partners in server rack system 200. In response to the negotiated bridge assurance operation being performed between each set of linked partners, the bridge assurance feature is enabled only when each linked partner supports the bridge assurance feature. Thus, if one of the linked partners does not support bridge assurance feature, the bridge assurance features is not enabled between the linked partners. For example, if top of rack switch 202 does not support the bridge assurance feature but server 204 does support the bridge assurance feature, then the bridge assurance feature is not enabled on the link between the top of rack switch and server 204. If server 204 and server 206 both support the bridge assurance feature, then the bridge assurance feature is enabled on the link between the servers. Thus, a particular server in server rack system 200 may have the bridge assurance feature enabled on one link and may have the bridge assurance feature disabled on another link from the server.

In response to the bridge assurance feature being enabled between linked partners, such as servers 204 and 206, STP BPDUs may sent out on all interfaces from a particular server including the alternate or backup interfaces which are in blocked state. In an example, an alternate or backup interface may be any interface from a backup memory module, such as memory module 222. In an example, the STP BPDUs may be continually or periodically sent between the linked partners.

In an example, if either interface of linked partners stops receiving the STP BPDUs from the peer of the linked partners, then that interface goes to discarding state. In this situation, when the STP process or the whole kernel encounters any failure/panic, the link partner, such as server 204, may enter a blocking state and a network loop is prevented. In an example, the negotiated bridge assurance improves information handling systems, such as servers 204-218, by implementing the bridge assurance feature only when both linked partners support the bridge assurance feature. Thus, negotiated bridge assurance prevents a network loop from being created as might result if only one of the linked partner supports the bridge assurance feature.

Figure 4:
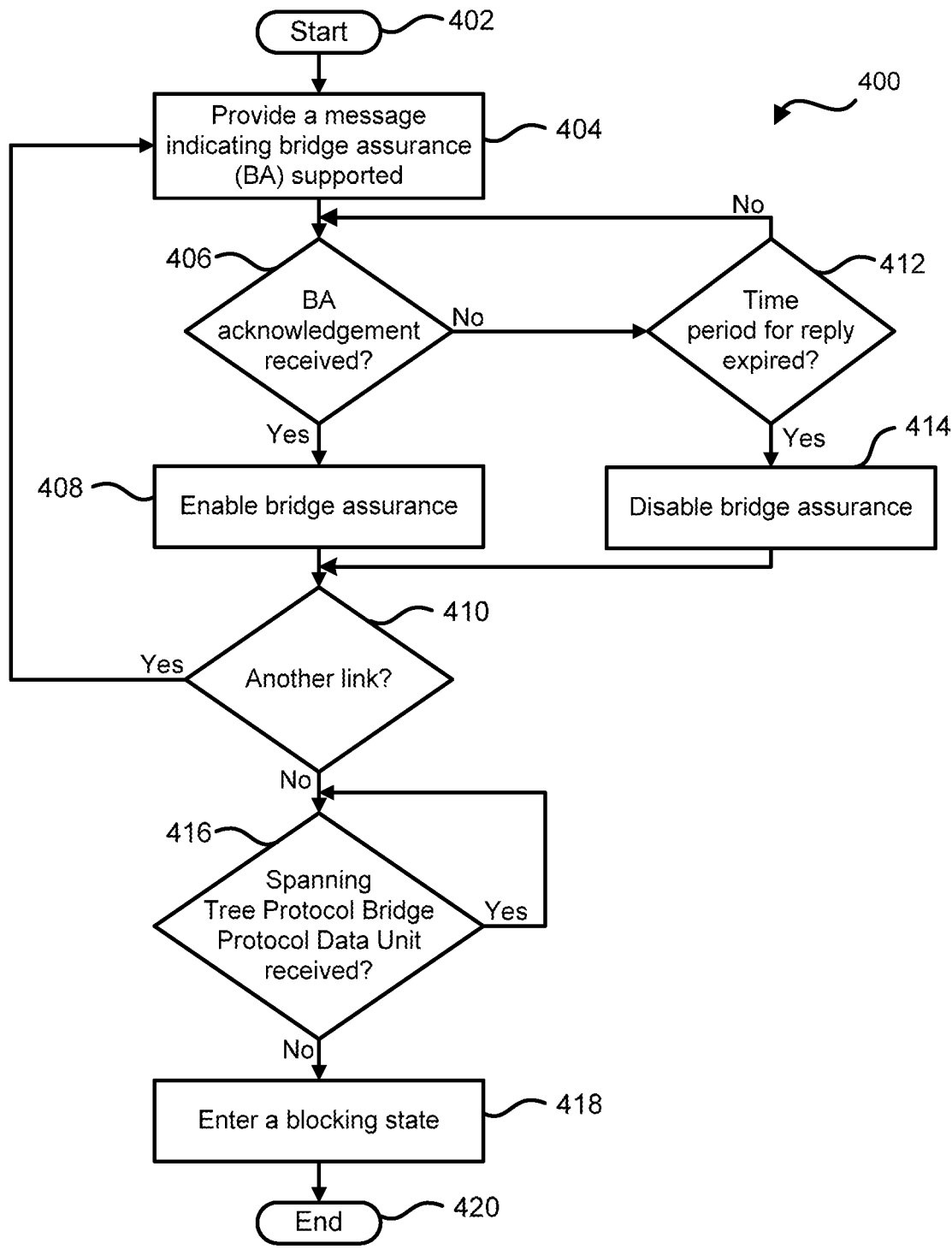
FIG. 4 is a flow diagram of a method for performing negotiated bridge assurance across all links of a device according to at least one embodiment of the present disclosure.

FIG. 4 illustrates a flow diagram of a method 400 for performing negotiated bridge assurance across all links of a device according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by management modules 220 and 222 of FIG. 2, or any other type of system, controller, device, module, processor, or any combination thereof, operable to employ all, or portions of, the method of FIG. 4.

At block 404, a message indicating that a bridge assurance feature is supported by a device is provided. The message may be provided from one information handling system to another. In an example, the message may be any suitable type of message including, but not limited to, an LLDP message. In certain examples, the indication that the bridge assurance feature is supported may be provided in any suitable manner including, but not limited to, a feature flag being set in an organization specific TLV of the LLDP message.

At block 406, a determination is made whether an ACK message has been received. In an example, the ACK message may indicate that the other information handling system supports the bridge assurance feature and that the feature is ready to be enabled. If the ACK message has been received, the bridge assurance feature is enabled on the information handling system, and the flow continues at block 410. In an example, when the bridge assurance feature is enabled, the information handling system and its linked partner may provide STP BPDUs on the link.

If the ACK message is not received, a determination is made whether a time period for reply has expired at block 412. In an example, the time period for reply may be any suitable length of time during which another device should receive the message and provide an ACK message. If the time period for reply has not expired, the flow continues as stated above at block 406. If the time period for reply has expired, the bridge assurance feature is disabled on the information handling system at block 414, and the flow continues at block 410.

At block 410, a determination is made whether another communication link is present for the information handling system. If another communication link is present, the flow continues as stated above at block 404. If another communication link is not present, a determination is made whether a STP BPDU is received at block 416. In response to a STP BPDU not being received, the information handling system is entered into a blocking state at block 418, and the flow ends at block 420. In an example, the blocking state prevents network loops from being created in a layer 2 network.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a plurality of data ports, wherein each of the data ports enables a separate communication link of a plurality of communication links for the information handling system;
a memory to store data to indicate whether the information handling system supports bridge assurance on each of the communication links; and
a processor to communicate with the memory, and in response to the bridge assurance being supported in the information handling system, the processor to:
provide a message across a first link of the communication links, wherein the message indicates that bridge assurance is supported in the information handling system;
determine whether an acknowledgement message has been received; and
in response to the acknowledgement message being received, enable the bridge assurance on the first link.

2. The information handling system of claim 1, wherein in response to the acknowledgement message not being received, the processor further to:
determine whether a specific amount of time has expired; and
in response to the specific amount of time having expired, disable the bridge assurance on the first link.

3. The information handling system of claim 1, wherein while the bridge assurance is enable on the first link, the processor further to:

communicate with a second information handling system via a spanning tree protocol;
determine whether a data frame of the spanning tree protocol is received; and
in response to the data frame of the spanning tree protocol not being received, place the first link in a discarding state.

4. The information handling system of claim 1, wherein the processor further to:
set a flag in an field of the message to indicate that the information handling system supports the bridge assurance.

5. The information handling system of claim 4, wherein the message is a link layer discovery protocol message.

6. The information handling system of claim 5, wherein the flag is located within an organization specific type length value frame of the link layer discovery protocol message.

7. The information handling system of claim 1, wherein the processor further to:
provide a second message across a second link of the communication links, wherein the second message indicates that bridge assurance is supported in the information handling system;
determine whether a second acknowledgement message has been received on the second link; and
in response to the second acknowledgement message not being received, disable the bridge assurance on the second link.

8. The information handling system of claim 1, wherein the acknowledgement message indicates that a second information handling system connected to the first link supports the bridge assurance.

9. A method comprising:
providing, via a plurality of data ports of an information handling system, a plurality of communication links, wherein each data port provides a separate one of the communication links;
determining, via a processor of the information handling system, whether the information handling system supports bridge assurance on the communication links; and
in response to bridge assurance being supported on the communication links:
providing a message across a first link of the communication links, wherein the message indicates that bridge assurance is supported in the information handling system;
determining whether an acknowledgement message has been received; and
in response to the acknowledgement message being received, enabling the bridge assurance on the first link.

10. The method of claim 9, wherein in response to the acknowledgement message not being received, the method further comprises:
determining whether a specific amount of time has expired; and
in response to the specific amount of time having expired, disabling the bridge assurance on the first link.

11. The method of claim 9, wherein while the bridge assurance is enable on the first link, the method further comprises:
communicating with a second information handling system via a spanning tree protocol;
determining whether a data frame of the spanning tree protocol is received; and
in response to the data frame of the spanning tree protocol not being received, placing the first link in a discarding state.

12. The method of claim 9, wherein the method further comprises:
setting a flag in an field of the message to indicate that the information handling system supports the bridge assurance.

13. The method of claim 12, wherein the message is a link layer discovery protocol message.

14. The method of claim 13, wherein the flag is located within an organization specific type length value frame of the link layer discovery protocol message.

15. The method of claim 9, wherein the method further comprises:
providing a second message across a second link of the communication links, wherein the second message indicates that bridge assurance is supported in the information handling system;
determining whether a second acknowledgement message has been received on the second link; and
in response to the second acknowledgement message not being received, disabling the bridge assurance on the second link.

16. The method of claim 9, wherein the acknowledgement message indicates that a second information handling system connected to the first link supports the bridge assurance.

17. A method comprising:
providing, via a plurality of data ports of an information handling system, a plurality of communication links, wherein each data port provides a separate one of the communication links;
if the information handling system supports bridge assurance on the communication links, then:
setting a flag in an field of a message to indicate that the information handling system supports the bridge assurance;
providing the message across a first link of the communication links, wherein the message indicates that bridge assurance is supported in the information handling system;
determining whether an acknowledgement message has been received, wherein the acknowledgement message indicates that a second information handling system connected to the first link supports the bridge assurance; and
in response to the acknowledgement message being received, enabling the bridge assurance on the first link.

18. The method of claim 16, wherein in response to the acknowledgement message not being received, the method further comprises:
determining whether a specific amount of time has expired; and
in response to the specific amount of time having expired, disabling the bridge assurance on the first link.

19. The method of claim 16, wherein while the bridge assurance is enable on the first link, the method further comprises:
communicating with a second information handling system via a spanning tree protocol;
determining whether a data frame of the spanning tree protocol is received; and
in response to the data frame of the spanning tree protocol not being received, placing the first link in a discarding state.

20. The method of claim 16, wherein the message is a link layer discovery protocol message.

21. The method of claim 16, wherein the flag is located within an organization specific type length value frame of the link layer discovery protocol message.

* * * * *